United States Patent
Liu et al.

(10) Patent No.: US 10,171,711 B1
(45) Date of Patent: Jan. 1, 2019

(54) DE-EMPHASIZED IMAGE SIGNAL TRANSMISSION

(71) Applicant: OmniVision Technologies, Inc., Santa Clara, CA (US)

(72) Inventors: Min Liu, Lexington, KY (US); Yun Hak Koh, San Jose, CA (US); Charles Wu, Palo Alto, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/872,233

(22) Filed: Jan. 16, 2018

(51) Int. Cl.
*H04N 5/21* (2006.01)
*H04N 5/38* (2006.01)

(52) U.S. Cl.
CPC .............. *H04N 5/21* (2013.01); *H04N 5/38* (2013.01)

(58) Field of Classification Search
CPC ............ H04N 5/21; H04N 5/38; H04N 5/228; H04N 3/12; H04N 5/232; H04N 3/125
USPC ...... 348/68, 613, 723, 724, 332, 222.1, 608; 375/297, 295; 327/108

IPC ............................ H04N 5/21,5/38, 5/228, 3/12
See application file for complete search history.

(56) References Cited

U.S. PATENT DOCUMENTS

| | | | |
|---|---|---|---|
| 6,373,346 B1 * | 4/2002 | Kobayashi | H03D 7/1425 332/159 |
| 7,714,615 B2 * | 5/2010 | Liang | H03K 19/0019 326/27 |
| 8,466,982 B2 | 6/2013 | Liu et al. | |
| 2012/0307122 A1 | 12/2012 | Liu et al. | |

* cited by examiner

*Primary Examiner* — Sherrie Hsia
(74) *Attorney, Agent, or Firm* — Christensen O'Connor Johnson Kindness PLLC

(57) ABSTRACT

A transmitter circuit coupled to output image data from an image sensor includes a plurality of transmitters. The transmitters may include a plurality of drivers coupled to receive a data signal, and output a differential signal in response to receiving the data signal. A de-emphasis circuit is coupled between a first output of a first driver in the plurality of drivers, and a second output of a second driver in the plurality of drivers. The de-emphasis circuit is coupled to receive a de-emphasis control signal, and in response to receiving the de-emphasis control signal, the de-emphasis circuit reduces a magnitude of the differential signal.

20 Claims, 9 Drawing Sheets

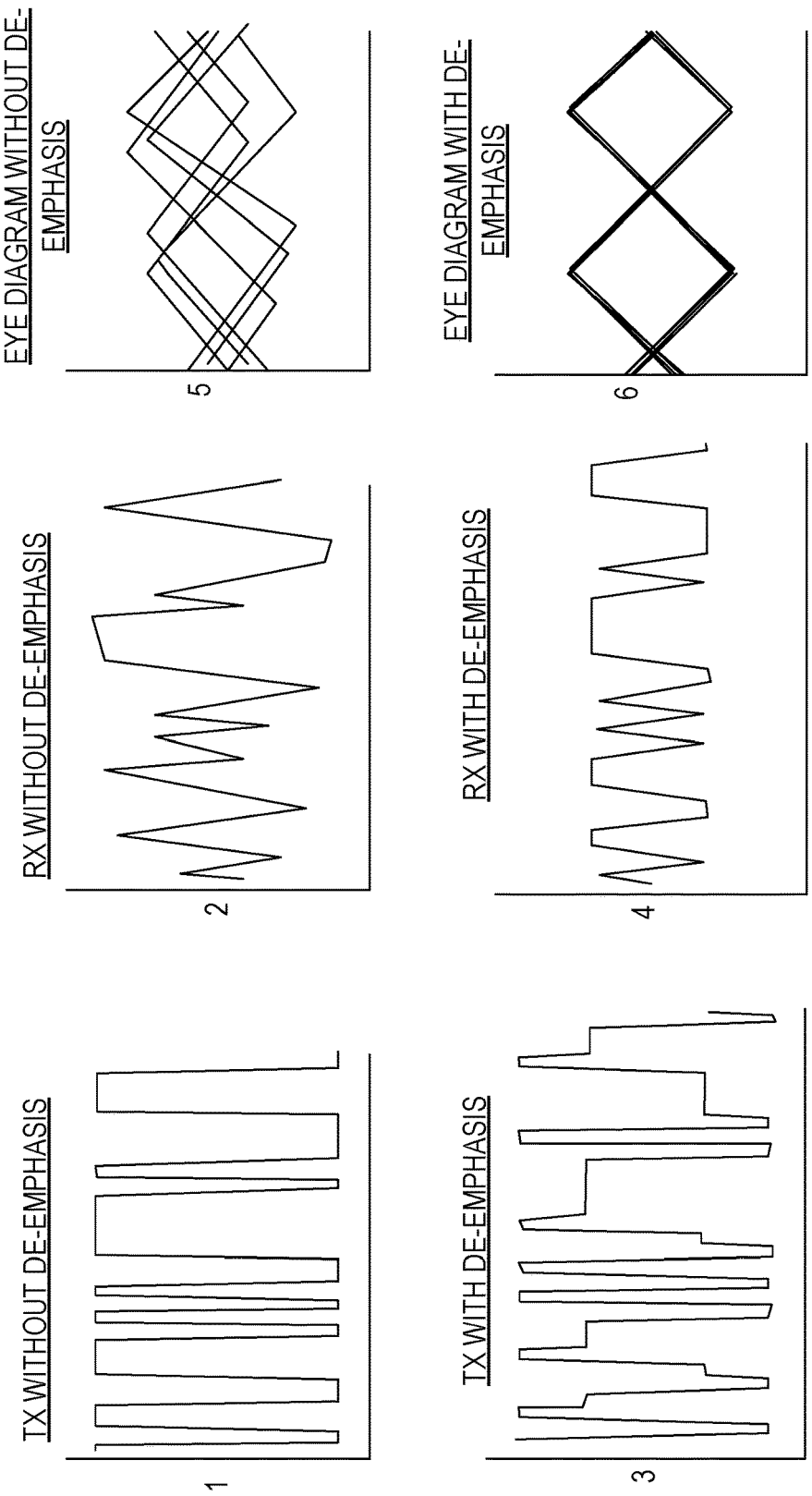

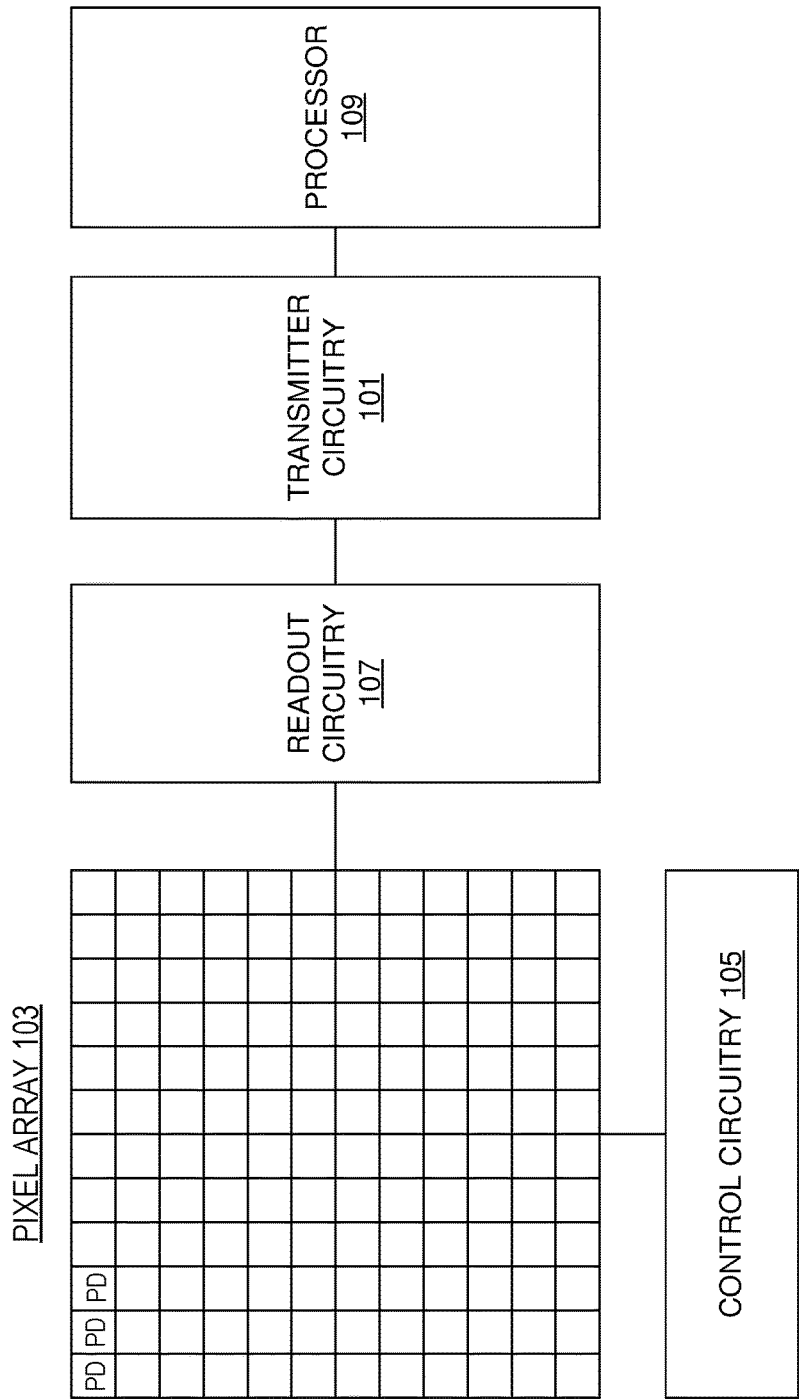

DE-EMPHASIZED IMAGE SIGNAL TRANSMISSION

TECHNICAL FIELD

This disclosure relates generally to image sensors, and in particular but not exclusively, relates to image signal transmission.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

The typical image sensor operates as follows. Image light from an external scene is incident on the image sensor. The image sensor includes a plurality of photosensitive elements such that each photosensitive element absorbs a portion of incident image light. Photosensitive elements included in the image sensor, such as photodiodes, each generate image charge upon absorption of the image light. The amount of image charge generated is proportional to the intensity of the image light. The generated image charge may be used to produce an image representing the external scene.

Once image data is captured by the image sensor, it may be necessary to send the image data to a processor or a controller to render the image, and apply any after effects (e.g., image filters). When image data is transferred from the image sensor to the processor, it is important to have a clean data signal (e.g., well defined high points and low points in the signal, corresponding to "1" and "0", respectively). This way the processor accurately receives the information that was sent. A noisy signal may cause the receiving component to misinterpret the information (e.g., mistake a "0" for a "1", or vice versa).

BRIEF DESCRIPTION OF THE DRAWINGS

Non-limiting and non-exhaustive examples of the invention are described with reference to the following figures, wherein like reference numerals refer to like parts throughout the various views unless otherwise specified.

FIG. 1A depicts image data transfer signals (with and without de-emphasis), as well as the corresponding signals that are received by a receiver.

FIG. 1B depicts an example imaging system that may send the image data transfer signals with de-emphasis depicted in FIG. 1A, in accordance with the teachings of the present disclosure.

Figure 2:
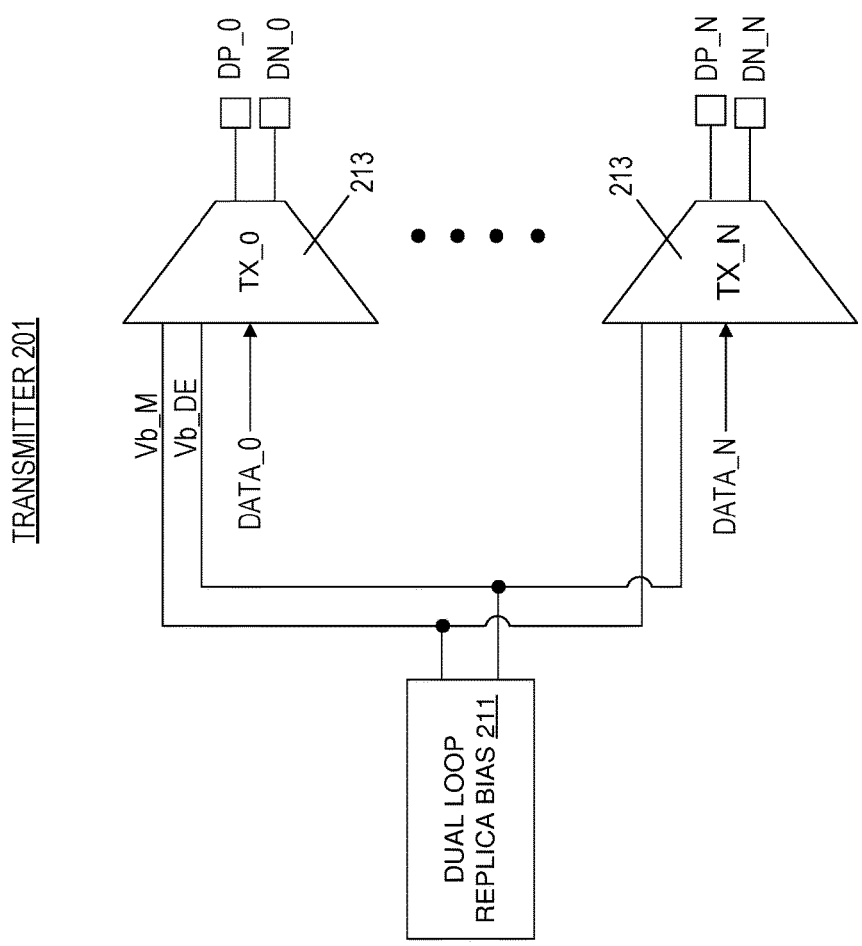
FIG. 2 illustrates example transmitter circuitry which may be included in the imaging system of FIG. 1B, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method relating to de-emphasized image signal transmission are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

As image size and frame rate increase, image sensors require a high-data rate transmitter to deliver high-data throughput to the image processor. In the new MIPI DPHY 2.0 specification (a standard governing data transfer), the highest data rate has reached 4.5 Gbps. In high-speed data transmission, channel loss is the major factor that limits the data transfer rate. Low pass channel loss will introduce inter-symbol interference (ISI) which will degrade the signal on receiver (RX) side. When the channel loss is high, data received at RX side may show high jitter and have a narrow eye opening—a figure of merit for data transfer (see e.g., graph 5, eye diagram without de-emphasis). For example, FIG. 1A shows a possible image data waveform output from a transmitter that does not employ de-emphasis (graph 1). As shown, without de-emphasis the signal oscillates between the maximum logic-high and logic-low states. Because of this, the signal seen by the receiver (graph 2) is noisy, and logic-high and logic-low states are not clearly defined.

Transfer-side (TX) de-emphasis of the signal may be used to address these issues. When transfer side de-emphasis is enabled, only the first data bit after every data transition is at full swing (see e.g., graph 3 of FIG. 1A). If there is no data transition, at second and later bits, the signal swing will be reduced (see smaller amplitude "reduced swing" portion of data signal). Transfer signal de-emphasis can reduce ISI and improve the eye diagram (see e.g., graph 6, eye diagram with de-emphasis showing clearly defined openings) at the receiving side (see e.g., graph 4 of FIG. 1A with clearly defined logic-high and logic-low states). An additional advantage of the transfer circuitry disclosed herein, is that there is no need for a dedicated power pad and associated external components. To achieve all of these features, examples of the instant disclosure add one extra replica bias loop to put the de-emphasis function into the transfer circuitry. This reduces processing steps/cost, and also saves space on the chip.

FIG. 1B illustrates imaging system 100. Imaging system 100 includes pixel array 103, control circuitry 105, readout circuitry 107, transmitter circuitry 101, and processor 109. In one example, pixel array 103 is a two-dimensional (2D) array of photodiodes (e.g., "PD" depicted), or image sensor pixels. As illustrated, photodiodes are arranged into rows and columns to acquire image data of a person, place, object, etc., which can then be used to render a 2D image of the person, place, object, etc. However, photodiodes do not have to be arranged into rows and columns and may take other configurations.

In one example, control circuitry 105 is coupled to pixel array 103 to control operation of the plurality of photodiodes in pixel array 103. For example, control circuitry 105 may generate a shutter signal for controlling image acquisition. In the depicted example, the shutter signal is a global shutter signal for simultaneously enabling all pixels within pixel array 103 to simultaneously capture their respective image data during a single acquisition window. In another example, image acquisition is synchronized with lighting effects such as a flash.

In one example, after each image sensor photodiode/pixel in pixel array 103 has acquired its image data or image charge, the image data is readout by readout circuitry 107 and then transferred to transmitter circuitry 101. In various examples, readout circuitry 107 may include amplification circuitry, analog-to-digital (ADC) conversion circuitry, or otherwise. Transmitter circuitry 101 may receive the image data and convert it into a signal which may be sent to processor 109, in accordance with a technical standard such as the MIPI DPHY 2.0 specification, or the like. Specifics of transmitter circuitry 101 will be described later in connection with FIGS. 2-6 and associated discussion.

Image data transferred with transmitter circuitry 101 may be sent to processor 109 (e.g., general purpose processor, controller, dedicated image processor, or the like), which can simply store the image data or even manipulate the image data by applying post imaging effects (e.g., autofocus, crop, rotate, remove red eye, adjust brightness, adjust contrast, or otherwise). Processor may also resize images to fit on the display of a device (e.g., smart phone or digital camera), apply filters, or the like.

In one example, imaging system 100 may be included in a digital camera, cell phone, laptop computer, automobile or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

FIG. 2 illustrates example transmitter circuitry 201 which may be included in the imaging system of FIG. 1B. As shown, there may be at least two transmitters 213. In the depicted example there are n+1 transmitters (TX_0-TX_N) 213 which may be identical to transmit DATA_0-DATA_N. Dual-loop replica bias circuit 211 will set all of the transmitters' electrical output parameters (voltage swing, common-mode voltage, etc) by adjusting Vb_M and Vb_DE. In the illustrated example, each transmitter outputs a differential signal. A differential signal is referenced to a local ground, and appears on both lines of a two-wire cable, in-phase and with equal amplitudes. Thus, the differential signal includes a first sub-signal and a second sub-signal, where the first sub-signal is complement of the second sub-signal.

Figure 3:
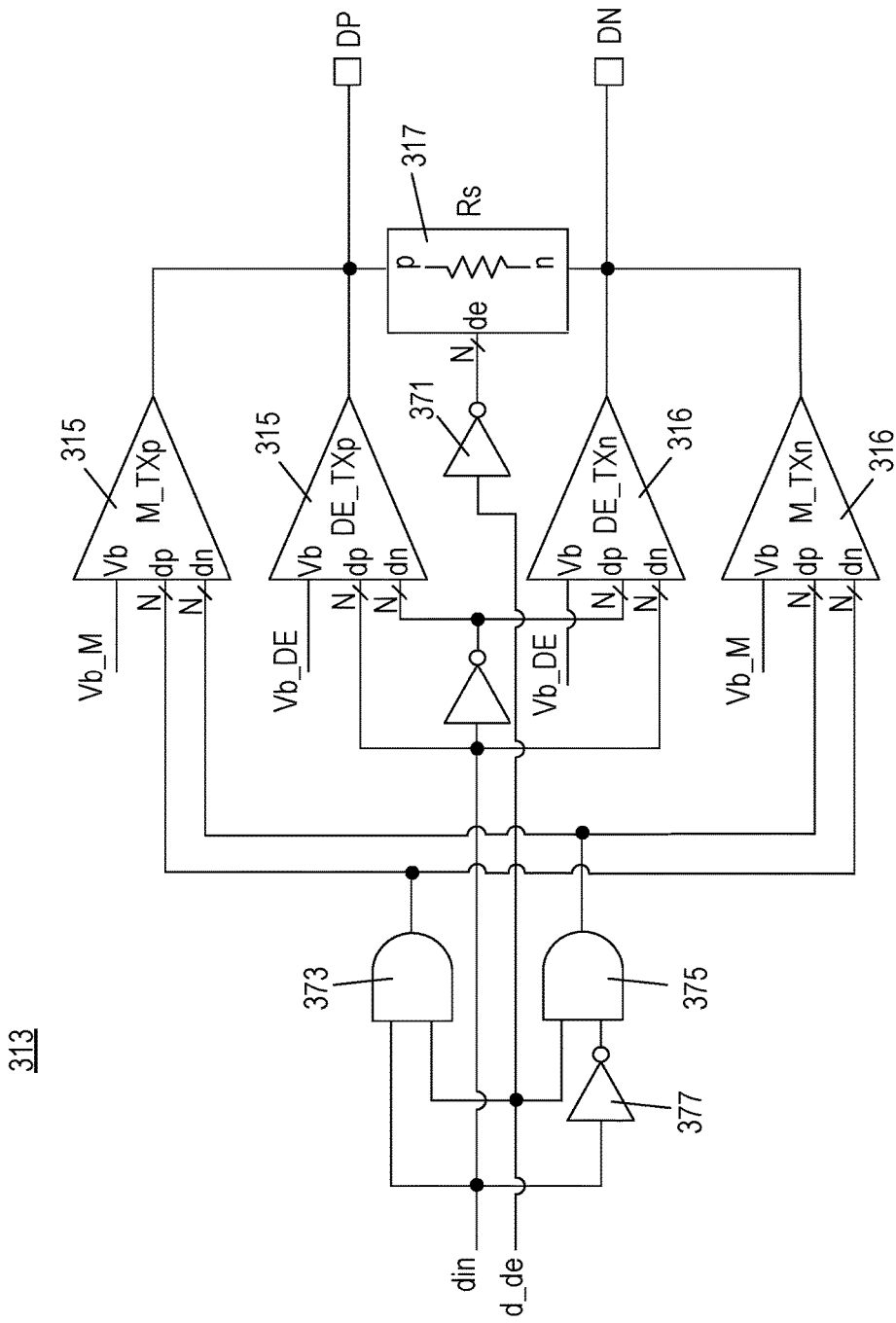
FIG. 3 illustrates example architecture for the individual transmitters in FIG. 2, in accordance with the teachings of the present disclosure.

FIG. 3 illustrates example architecture for the individual transmitters (TX) 313 in FIG. 2. As illustrated, the structure of transmitter 313 is differential with two output pads: "DP" and "DN". A plurality of multi-branch drivers 315/316 (e.g., M_TXp, M_TXn, DE_TXp, and DE_TXn) are coupled to receive a data signal (e.g., "din") and output a differential signal (e.g., from DP and DN), in response to receiving the data signal. In the depicted example, de-emphasis circuit (Rs) 317 is a multi-branch shunt resistor circuit. The number of branches is configurable to meet output impedance and de-emphasis strength requirements. Vb_M and Vb_DE are controlled by replica bias block (see e.g., FIG. 2, dual loop replica bias 211) to set the transfer output voltage level. Input "din" is the data signal to be transmitted, and "d_de" is the de-emphasis control signal which will dynamically control the output of full-swing or reduced-swing data signals depending on the pattern of "din" data.

As illustrated de-emphasis circuit 317 is coupled between a first output of first driver 315 in the plurality of drivers 315/316, and a second output of second driver 316 in the plurality of drivers 315/316. More specifically, de-emphasis circuit 317 is coupled to the outputs of all four driver circuits 315 and 316 depicted, as well as the output of inverter 371, which is coupled to receive the de-emphasis control signal. In response to receiving the de-emphasis control signal from inverter 371, de-emphasis circuit 317 reduces a magnitude of the differential signal. As shown de-emphasis circuit 317 is coupled between a first output (DN) of the first sub-signal and a second output (DP) of the second sub signal. The de-emphasis control signal electrically connects the first output of the first sub-signal through de-emphasis circuit Rs 317 to the second output of the second sub signal to reduce the magnitude of the differential signal.

As shown, both DE_TXp, and DE_TXn drivers are coupled to an inverter to receive an inverted "din" signal. Additionally the output of first AND 373 gate is coupled to M_TXn and M_TXp drivers, and the inputs of first AND gate 373 are coupled to "din", "d_de", and the input of second AND gate 375. The second input of second AND gate 375 is coupled to inverter 377, which is coupled to "din". The output of second AND gate 375 is also coupled to inputs of M_TXn and M_TXp drivers.

Figure 4B:
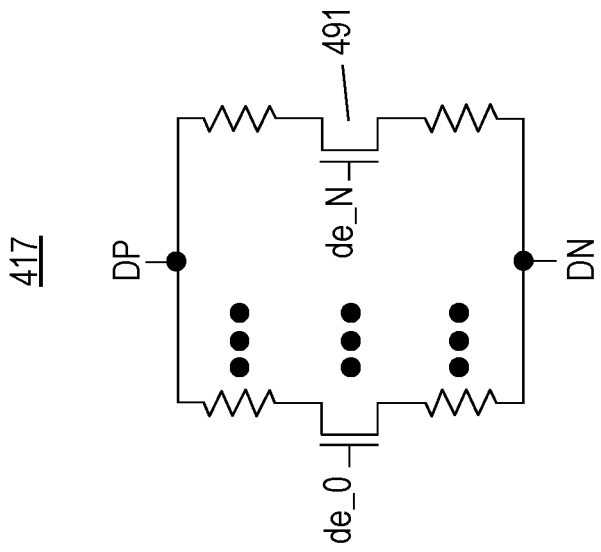
FIG. 4B illustrates example architecture for the de-emphasis circuit depicted in FIG. 3, in accordance with the teachings of the present disclosure.
Figure 4A:
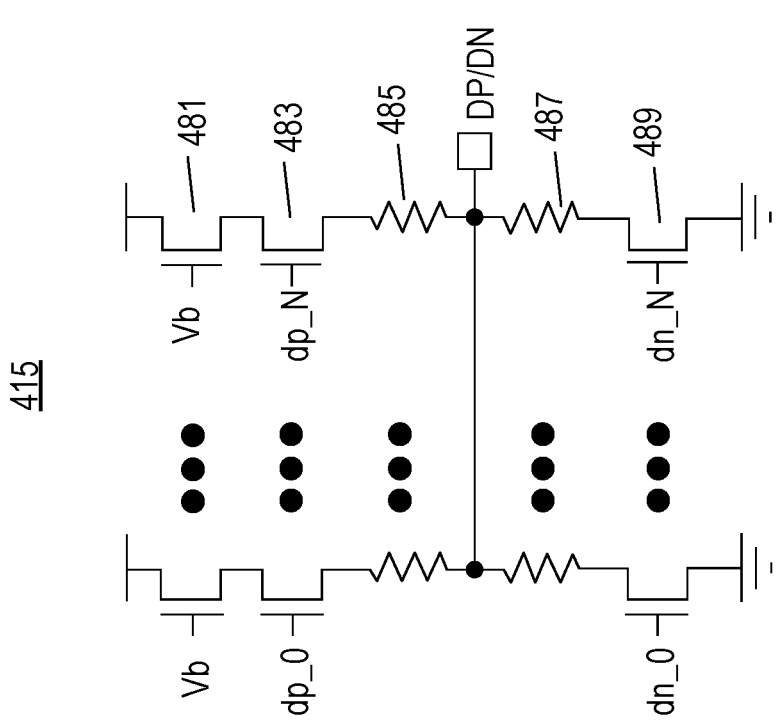
FIG. 4A illustrates example architecture for the individual drivers depicted in FIG. 3, in accordance with the teachings of the present disclosure.

FIG. 4A illustrates example architecture for the individual drivers 415 depicted in FIG. 3, in accordance with the teachings of the present disclosure. As illustrated both M_TXp, M_TXn, DE_TXp, and DE_TXn drivers have the same multi-branch structure with three transistors (e.g., 481, 483, and 489) connected in series on each branch. However, each transistor's, and each resistor's, specification (e.g., max load, etc.) might be different depending on the system requirements. Vb is the bias voltage generated by the replica bias circuit, and is connected to the gate terminal of NMOS source follower transistor 481 which is coupled to output the power rail. Both dp_x and dn_x are data signals to turn on/off NMOS transistors 483 and 489 in the pull up (to power rail) path and the pull down (to ground) path. As shown second transistor 483 has a first terminal coupled to a second terminal of first transistor 481. The first terminal of third transistor 489 is coupled to the second terminal of second transistor 483, and the second terminal of third transistor 489 is coupled to ground. As shown and described above, each of the branches are coupled to a dual-loop replica bias circuit to receive an output swing control voltage and a de-emphasis common mode control voltage.

As illustrated, first resistor 485 is coupled to the second terminal of second transistor 483 and DP or DN (depending on the specific driver depicted). A second resistor 487 is coupled between first resistor 485 and third transistor 489. Second resistor 487 is also coupled to DP or DN (depending on the specific driver depicted).

FIG. 4B illustrates example architecture for de-emphasis circuit 417 depicted in FIG. 3. In the depicted example, de-emphasis circuit 417 is a shunt resistor circuit array circuit: de_x (x=0, 1, . . . , N+1) are the de-emphasis control signals coupled to the gates to enable/disable NMOS switches 491 connected to respective shunt resistors to enable/disable the shunt resistors. In other words, the shunt resistor circuits are coupled to a plurality of transistors 491, and the plurality of transistors 491 are coupled in parallel between the first output of the first sub-signal (e.g., DP) and the second output of the second sub signal (e.g., DN) to regulate current flow between the first output of the first sub-signal and the second output of the second sub signal.

Figure 5A:
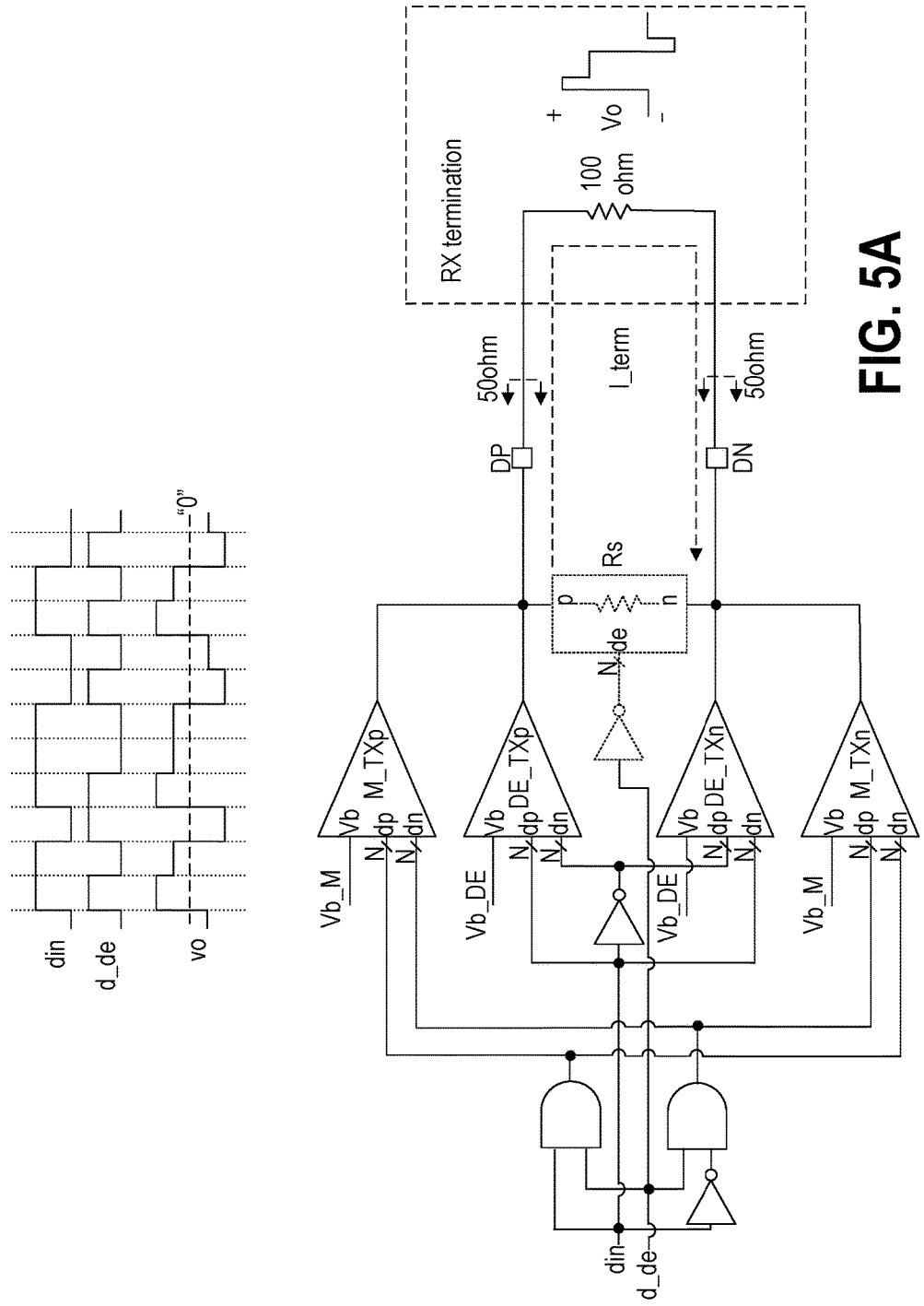
FIGS. 5A and 5B illustrate operation of the circuit diagram in FIG. 3, in accordance with the teachings of the present disclosure.
Figure 5B:
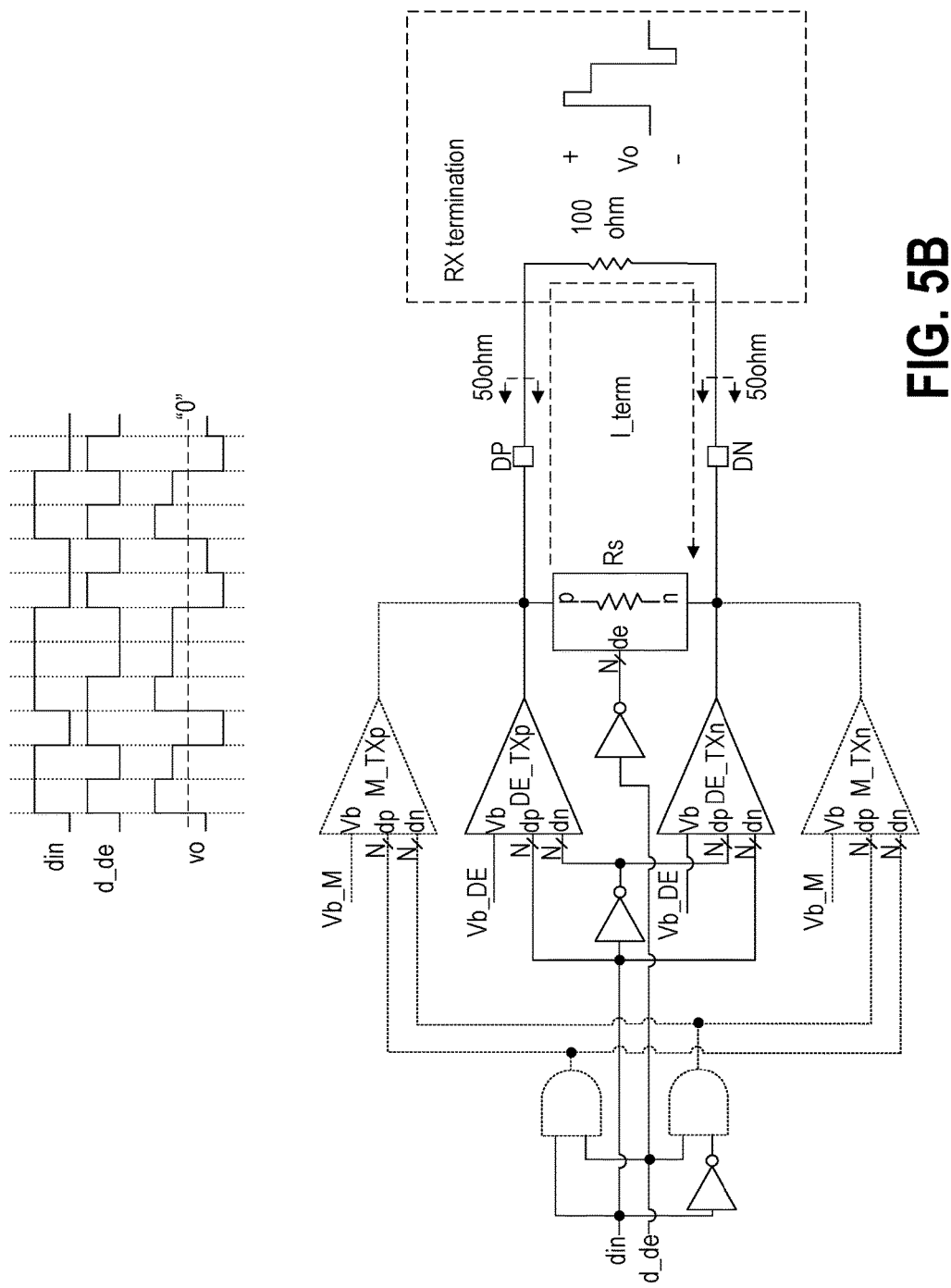

FIGS. 5A and 5B illustrate operation of the circuit diagram in FIG. 3, in accordance with the teachings of the present disclosure. Specifically, FIG. 5A shows full-swing operation: the data signal output has a large amplitude because the de-emphasis circuit is disabled (dashed line) since no de-emphasis control signal is applied. Conversely, FIG. 5B shows the effects of applying the de-emphasis control signal to enable (solid line) the de-emphasis circuit. As illustrated in FIG. 5B, both M_TXp and M_TXn drivers are disabled (dashed line) along with both first and second AND gates in the reduced swing mode. In the depicted example, the number of branches in the drivers and shunt resistor circuit array is selected to maintain driver output impedance at 50 ohms for both full swing and reduced swing operation.

Figure 6:
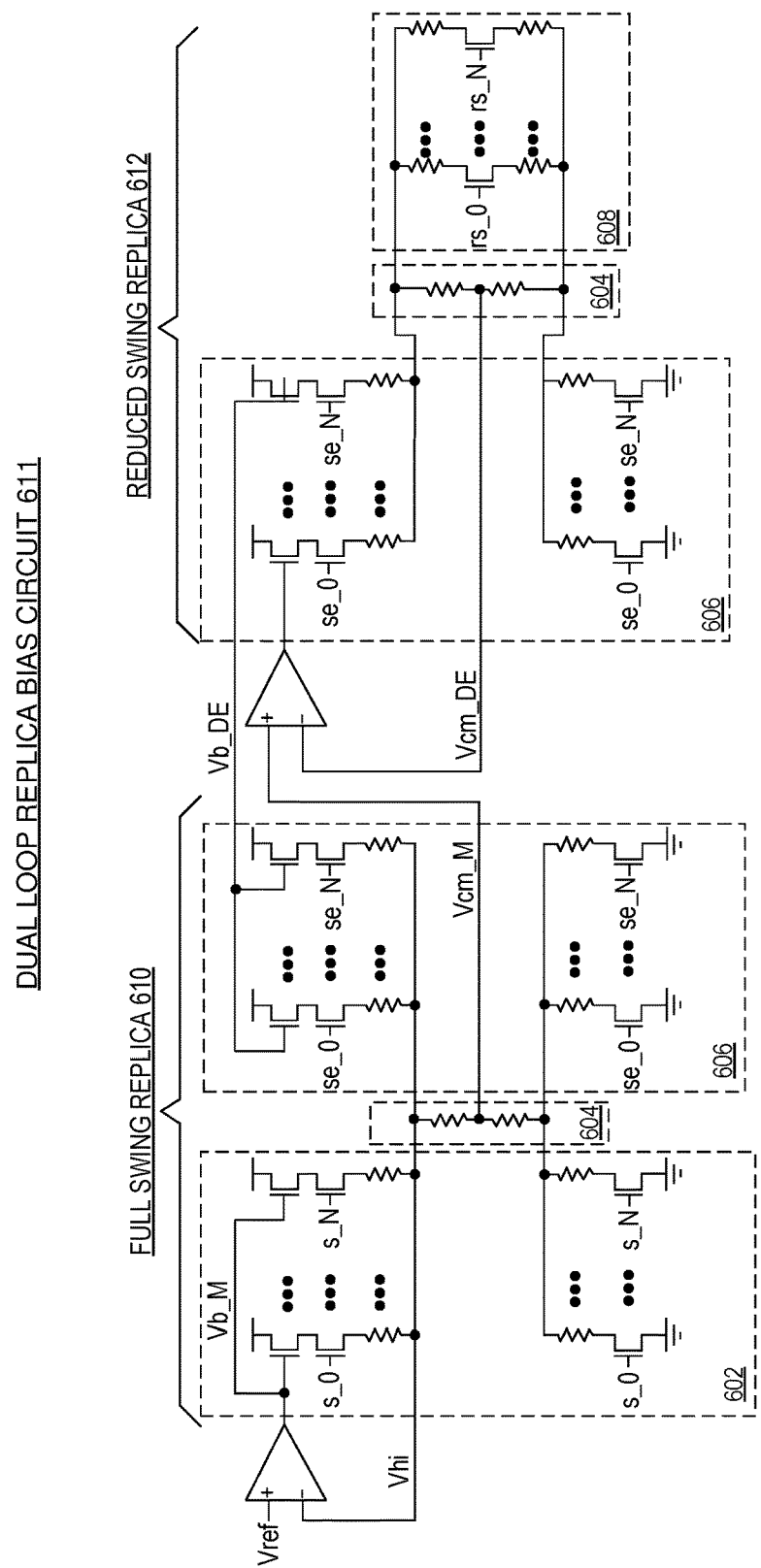
FIG. 6 illustrates one example of a dual loop replica bias circuit depicted in FIG. 2, in accordance with the teachings of the present disclosure.

FIG. 6 illustrates one example of a dual loop replica bias circuit 611 depicted in FIG. 2, in accordance with the teachings of the present disclosure. Block 602 represents a scaled replica of the M_TX(p/n) drivers, and s_0-N are static control, which is decided by the number of branches used in the final M_TX driver in full swing mode. Block 606 represents a scaled replica of the DE_TX(p/n) drivers and se_0-N are static control, which is decided by the number of branches used in the final De_TX driver in reduced swing mode. Block 608 is a scaled replica of the shunt resistor circuit, and rs_0-N are static control, which is decided by the number of branches used in the final shunt resistor circuit in reduced wing mode. Blocks 604 represent scaled replicas of the RX termination circuit. As illustrated, the blocks in dual-loop replica bias circuit are configured into a full swing loop 610 and a reduced swing loop 612 which are coupled to output the output swing control voltage and the de-emphasis common mode control voltage.

In one example, full swing loop 610 will adjust the Vb_M voltage so that the transmitter output high voltage at full swing equals the voltage reference Vref (which is 300 mV for the MIPI DPHY standard). As illustrated, full swing loop 610 includes scaled replicas of the M_TX drivers 602, DE_TX drivers 606, and RX termination resistor 604.

In one example, reduced swing loop 612 will adjust the Vb_DE voltage so that common-mode voltage of the reduced swing equals the common-mode voltage of full swing. Reduced swing loop 612 will help reduce common-mode voltage ripples during the transition between full swing and reduced swing modes. Reduced swing loop 612 includes scaled replicas of the DE_TX driver 606, RX termination resistor 604, and shunt resistor circuit 608. In some examples, the transmitter replica circuit block in the replica bias may be a scaled down version in order to save chip space. For example in a 1/N scale down, the transistor width will be 1/N of original width and resistor values will be N times of the original value.

Figure 7:
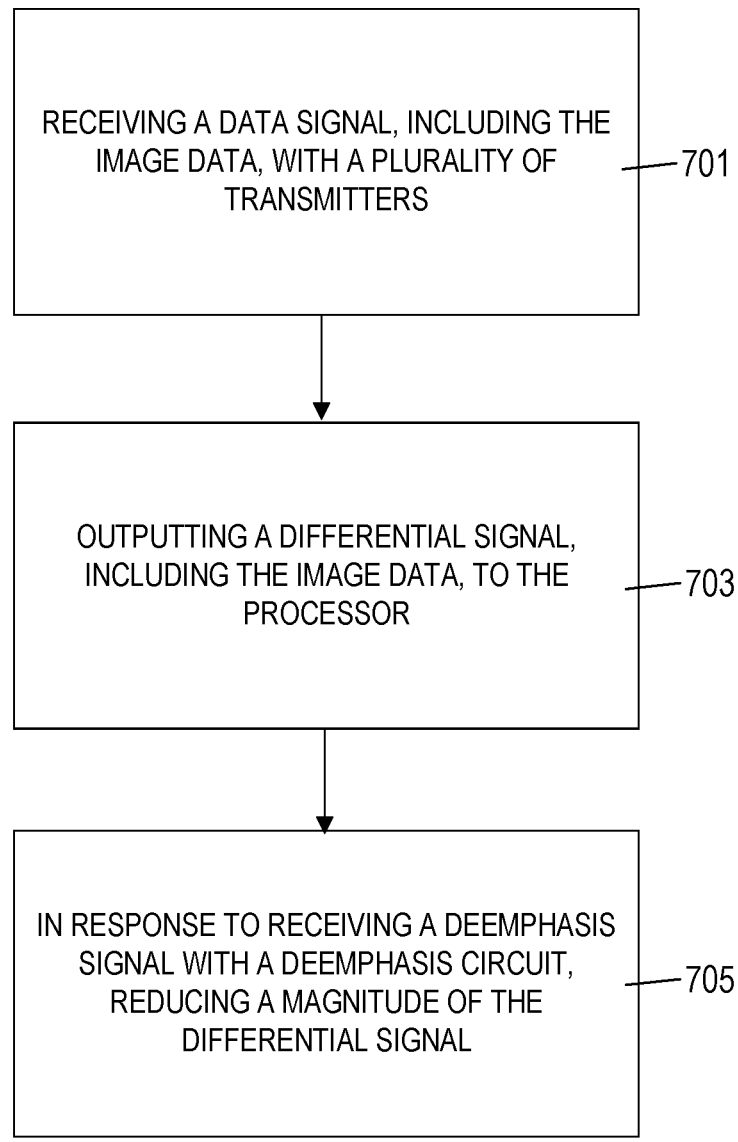
FIG. 7 is one example of a method to transfer image data from an image sensor to a processor, in accordance with the teachings of the present disclosure.

FIG. 7 is one example of a method 700 to transfer image data from an image sensor to a processor. One of ordinary skill in the art having the benefit of the present disclosure will appreciate that blocks 701-705 may occur in any order and even in parallel. Moreover, blocks may be added to, or removed from, method 700 in accordance with the teachings of the present disclosure.

Block 701 shows receiving a data signal, including image data, with a plurality of transmitters, and the plurality of transmitters include a plurality of drivers. In some examples, receiving data with the transmitters may include reading out the image data from an image sensor with readout circuitry coupled to the image sensor, and then transferring the data signal from the readout circuitry to transmitter circuitry including the plurality of transmitters.

Block 703 depicts outputting a differential signal from the plurality of transmitters, including the image data, to a processor. The differential signal may have an initial large amplitude ("full swing") when bits of data are first transmitted. It is appreciated that the processor (or controller) may include logic (e.g., hardware, software, or a combination thereof) stored in a machine readable storage medium (e.g., RAM, ROM, or the like) that when executed by the processor causes the processor to perform a variety of operations such as crop the image, apply filters, or simply render the image on a screen.

Block 705 illustrates, in response to receiving a de-emphasis control signal (with a de-emphasis circuit coupled between a first output of a first driver in the plurality of drivers and a second output of a second driver in the plurality of drivers), reducing a magnitude of the differential signal. Put another way, an amplitude of the differential signal is decreased ("reduced swing") in response to the de-emphasis control signal. By decreasing the amplitude of the differential signal after the initial full-swing, a much cleaner signal is sent to the receiver.

In the above description, various pieces of circuitry are described. One of ordinary skill in the art having the benefit of the present disclosure will appreciate that the timing of electrical signals applied to the various pieces of circuitry can occur in any order and even in parallel. Moreover, pieces of circuitry and timing events may be added or removed, in accordance with the teachings of the present disclosure. It is appreciated that transistors may be referred to as "switches" or "gates" in accordance with the teachings of the present disclosure.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A transmitter circuit coupled to output image data from an image sensor, comprising:
   a plurality of transmitters including:
      a plurality of drivers, including a first driver and a second driver, coupled to receive a data signal and output a differential signal in response to receiving the data signal, wherein the plurality of drivers further includes a third driver and a fourth driver coupled to receive the data signal and a de-emphasis control signal, wherein in response to receiving the de-emphasis control signal the third driver and the fourth driver are disabled; and
      a de-emphasis circuit coupled between a first output of the first driver in the plurality of drivers, and a second output of the second driver in the plurality of drivers, wherein the de-emphasis circuit is coupled to receive the de-emphasis control signal, and in response to receiving the de-emphasis control signal, the de-emphasis circuit reduces a magnitude of the differential signal.

2. The transmitter circuit of claim 1, wherein the differential signal includes a first sub-signal and a second sub-signal, wherein the first sub-signal is complement of the second sub-signal, and wherein the de-emphasis circuit is coupled between a first output of the first sub-signal and a second output of the second sub signal, and wherein the de-emphasis control signal electrically connects the first output of the first sub-signal and the second output of the second sub signal to reduce the magnitude of the differential signal.

3. The transmitter circuit of claim 2, wherein the de-emphasis circuit includes a shunt resistor circuit.

4. The transmitter circuit of claim 3, wherein the shunt resistor circuit includes a plurality of transistors, wherein the plurality of transistors are coupled in parallel between the first output of the first sub-signal and the second output of the second sub signal to regulate current flow between the first output of the first sub-signal and the second output of the second sub signal, and wherein a gate terminal of each transistor in the plurality of transistors is coupled to receive the de-emphasis control signal.

5. The transmitter circuit of claim 2, wherein each driver in the plurality of drivers has a plurality of branches, wherein each branch in the plurality of branches includes:
   a first transistor with a first terminal of the first transistor coupled to power,
   a second transistor, wherein a first terminal of the second transistor is coupled to a second terminal of the first transistor; and
   a third transistor, wherein the first terminal of the third transistor is coupled to a second terminal of the second transistor, and the second terminal of the third transistor is coupled to ground.

6. The transmitter circuit of claim 5, wherein each branch in the plurality of branches further includes:
   a first resistor coupled to the second terminal of the second transistor; and
   a second resistor coupled between the first resistor and the third transistor.

7. The transmitter circuit of claim 5, wherein the plurality of branches are coupled to a dual-loop replica bias circuit to receive an output swing control voltage and a de-emphasis common mode control voltage.

8. The transmitter circuit of claim 7, wherein the dual-loop replica bias circuit includes a full swing loop and a reduced swing loop coupled to output the output swing control voltage and the de-emphasis common mode control voltage.

9. An image sensor system comprising:
   an image sensor including a plurality of photodiodes disposed in a semiconductor substrate to capture image charge and output image data;
   control circuitry coupled to the image sensor to control operation of the plurality of photodiodes;
   readout circuitry coupled to the image sensor to readout the image data from the plurality of photodiodes;
   a processor coupled to process the image data output from the plurality of photodiodes; and
   a transmitter circuit coupled to output the image data from the readout circuitry to the processor, comprising:
   a plurality of transmitters including:
      a plurality of drivers, including a first driver and a second driver, coupled to receive a data signal and output a differential signal in response to receiving the data signal, wherein the plurality of drivers further includes a third driver and a fourth driver coupled to receive the data signal and a de-emphasis control signal, wherein in response to receiving the de-emphasis control signal the third driver and the fourth driver are disabled; and
      a de-emphasis circuit coupled between a first output of the first driver in the plurality of drivers, and a second output of the second driver in the plurality of drivers, wherein the de-emphasis circuit is coupled to receive the de-emphasis control signal, and in response to receiving the de-emphasis control signal, the de-emphasis circuit reduces a magnitude of the differential signal.

10. The system of claim 9, wherein the differential signal includes a first sub-signal and a second sub-signal, wherein the first sub-signal is complement of the second sub-signal, and wherein the de-emphasis circuit is coupled between a first output of the first sub-signal and a second output of the second sub signal, and wherein the de-emphasis control signal electrically connects the first output of the first sub-signal and the second output of the second sub signal to reduce the magnitude of the differential signal.

11. The transmitter circuit of claim 10, wherein the de-emphasis circuit includes a shunt resistor circuit.

12. The transmitter circuit of claim 11, wherein the shunt resistor circuit includes a plurality of transistors, wherein the plurality of transistors are coupled in parallel between the first output of the first sub-signal and the second output of the second sub signal to regulate current flow between the first output of the first sub-signal and the second output of the second sub signal, and wherein a gate terminal of each transistor in the plurality of transistors is coupled to receive the de-emphasis control signal.

13. The transmitter circuit of claim 12, wherein each driver in the plurality of drivers has a plurality of branches, wherein each branch in the plurality of branches includes:

a first transistor with a first terminal of the first transistor coupled to power, a second transistor, wherein a first terminal of the second transistor is coupled to a second terminal of the first transistor; and a third transistor, wherein the first terminal of the third transistor is coupled to a second terminal of the second transistor, and the second terminal of the third transistor is coupled to ground.

14. A method of transferring image data from an image sensor to a processor, comprising:

receiving a data signal, including the image data, with a plurality of transmitters including a plurality of drivers, wherein the plurality of drivers includes a first driver, a second driver, a third driver, and a fourth driver, wherein the third driver and the fourth driver are coupled to receive the data signal and a de-emphasis control signal, wherein in response to receiving the de-emphasis control signal the third driver and the fourth driver are disabled; and outputting a differential signal, including the image data, to the processor; and in response to receiving the de-emphasis control signal with a de-emphasis circuit coupled between a first output of the first driver in the plurality of drivers and a second output of the second driver in the plurality of drivers, reducing a magnitude of the differential signal.

15. The method of claim 14, wherein the differential signal includes a first sub-signal and a second sub-signal, wherein the first sub-signal is complement of the second sub-signal, and wherein the de-emphasis circuit is coupled between a first output of the first sub-signal and a second output of the second sub signal, and wherein the de-emphasis control signal electrically connects the first output of the first sub-signal and the second output of the second sub signal to reduce the magnitude of the differential signal.

16. The method of claim 15, wherein the de-emphasis circuit includes a shunt resistor circuit.

17. The method of claim 16, wherein the shunt resistor circuit includes a plurality of transistors coupled in parallel between the first output of the first sub-signal and the second output of the second sub signal.

18. The method of claim 17, wherein reducing a magnitude of the differential signal, includes:

turning on the plurality of transistors coupled between the first output the first output of the first sub-signal and the second output of the second sub signal, by applying the de-emphasis control signal to a gate terminal of each transistor in the plurality of transistors.

19. The method of claim 17, wherein a first resistor and a second resistor are coupled to a first terminal and a second terminal, respectively, of each transistor in the plurality of transistors.

20. The method of claim 14, further comprising reading out the image data from the image sensor with readout circuitry coupled to the image sensor and the plurality of transmitters.

* * * * *